(12) United States Patent
Nakamura et al.

(10) Patent No.: US 6,516,680 B1
(45) Date of Patent: Feb. 11, 2003

(54) POWER STEERING APPARATUS

(75) Inventors: Masahide Nakamura, Nara (JP);
Kensaku Nakamura, Osaka (JP);
Osamu Sano, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/724,549

(22) Filed: Nov. 28, 2000

Related U.S. Application Data

(63) Continuation-in-part of application No. 09/173,036, filed on Oct. 15, 1998, now Pat. No. 6,227,064.

(51) Int. Cl.[7] .............................. B62D 5/04; F16H 25/20
(52) U.S. Cl. .............. 74/388 PS; 74/89.42; 74/424.72; 74/424.81; 74/424.95
(58) Field of Search .................... 74/388 PS, 499, 74/89.42, 89.3, 424.72, 424.81, 424.91, 424.94, 424.95

(56) References Cited

U.S. PATENT DOCUMENTS

| | | | |
|---|---|---|---|
| 3,966,280 A | | 6/1976 | Olrik |
| 4,403,522 A | | 9/1983 | Kumpar |
| 4,856,356 A | * | 8/1989 | Gartner ............... 74/424.89 |
| 5,669,296 A | * | 9/1997 | Newton ............... 100/231 |
| 6,244,125 B1 | * | 6/2001 | Sano .................. 74/388 PS |

FOREIGN PATENT DOCUMENTS

| | | | |
|---|---|---|---|
| DE | 2 327 213 | * | 12/1974 |
| DE | 3916493 | | 11/1990 |
| EP | 0 122 596 | | 10/1984 |
| EP | 0 244 556 | | 11/1987 |
| EP | 0 606 509 | * | 7/1994 |
| GB | 2 277 788 | * | 11/1994 |
| JP | 06-135339 | * | 5/1994 |

* cited by examiner

Primary Examiner—William C Joyce
(74) Attorney, Agent, or Firm—Darby & Darby

(57) ABSTRACT

A power steering apparatus comprises a rotary cylinder supported with its movement in the axial direction restrained and rotated coaxially with the steering shaft by the force transmitted from the motor for assisting steering, a plurality of feed rings held eccentrically in said rotary cylinder with their axial centers in parallel, and an engaging groove formed spirally around the outer circumference of the steering shaft for engaging with the projections provided circumferentially on the inner surfaces of the respective feed rings. With this arrangement, it becomes possible to convert the rotation of the motor into the movement in the axial direction of the steering shaft. Thus, this power steering apparatus has a low noise power transmission mechanism with a simple structure.

8 Claims, 13 Drawing Sheets

POWER STEERING APPARATUS

This patent application is a continuation-in-part of U.S. patent application Ser. No. 09/173,036, filed on Oct. 15, 1998 now U.S. Pat. No. 6,227,064, which is incorporated herein by reference.

FIELD OF THE INVENTION

The present invention relates to a power steering apparatus comprising a motor as a power-source of the steering assisting force.

DESCRIPTION OF RELATED ART

Power steering apparatus is to alleviate the labor burden required for steering by rotating a steering wheel and to receive favorable steering feeling such apparatus is equipped in many automobiles. Furthermore, in recent years there has been practically employed an electric power steering apparatus utilizing an electric motor which is driven according to the operation of the steering wheel, instead of the hydraulic actuator extensively used conventionally.

Such power steering apparatus has a merit of elastically meeting to the change of the properties of the assisting force according to the operating conditions such as HI/LOW of the vehicle speed, LARGE/SMALL of the steering angle, and the like by control of motor driving for steering assistance, however, in realization of such control, a transmission system for transmitting the rotation of the motor for steering assistance to the steering mechanism is essential.

The motor for steering assistance is provided in linkage with the steering wheel. The motor are connected with the middle portion of a steering column which rotates according to steering of the steering wheel or provided at the middle portion of the steering shaft, both ends of which is connected with traveling wheels (in general, right and left front traveling wheels), for steering by shifting in the axial direction (e.g., a rack shaft in the rack-pinion type steering mechanism). In the former, however the rotation of the motor for steering assisting is to be transmitted to the steering column which is a rotary member, and while there is a benefit that the above transmission system can be simply constituted by a general gearwheel reduction mechanism, the portion of the steering column outside the saloon is small, so that it is difficult to secure a installation position for the transmission system including said motor, and there is an inconvenience that the application range could be limited.

Against the above, however the latter has complicated constitution of the transmission system for converting the rotation of the motor for steering assistance into the shift of the steering shaft in the axial direction, it has large freedom for arranging positions of the transmission system including the motor over the axial length of the steering shaft arranged to the right and left in the bow of the vehicle, and has an advantage of applicability to extensive kinds of vehicles. However, even in this constitution, curtailment of the space for arranging the transmission system including the motor as above is an important task. For example, as disclosed in Japanese Patent Laid-open Publication No. S61-191468, a power steering apparatus aiming at curtailing the installation space by using a ball screw mechanism for the above transmission system has so far been proposed.

This power steering apparatus employs a portion of the steering shaft as a male screw member on the outer periphery of which a thread of the ball screw is formed, and on the outside of the male screw member, there are arranged the nut members which are screw connected through a large number of balls with restraint given to the movement in the axial direction in the housing for supporting the steering shaft, and the rotation force from the motor for steering assisting is transmitted to the nut member, so that according to the rotation the steering shaft is shifted to the axial direction by utilizing the screw advance of the ball screw. By this, it is possible to constitute the transmission mechanism that gives the large reduction ratio inside said housing compact, and by mounting the miniaturized motor near the housing of the steering shaft, the requirements for reducing the layout space as described above can be met.

However, in the conventional constitution as above, there is required high precision for forming the ball screw thread in the outer periphery of the steering shaft, for which a large number of steps are required for processing; moreover, great amount of labor is required for adjusting screw engagements between the ball screw threaded male screw member and the nut member.

Though the balls which are filled in the ball screw thread in the nut member move in rotation in the screw groove according to the screw advance of the balls screw to smooth the movement of the steering shaft, but at the same time the balls deflect by their rotational movement in the direction of movement of the steering shaft. In order to prevent this deflection, there are provided bypass mechanisms for moving the balls in circulation at the right and left ends in the nut member, thereby supporting smooth movement in rotation of the balls. However, the bypass mechanisms constituted in the nut member are extremely complicated, involving the problems that due to a large number of portions constituting the said mechanisms increases are caused in the number of steps for assembly and cost.

Furthermore, there is another problem that in the above bypass mechanism and ball screw thread, because there is no retaining member to keep the distance between the balls constant, the balls collide against one another and the noise generated thereby is large.

The present invention has been made in reflection of the situation as above. An object of the invention is to provide a power steering apparatus which generates low noise and which can securely convert the rotation of the motor for steering assistance to the movement of the steering shaft in the axial direction by the transmission system having a simple constitution to take the place of the ball screw mechanism, thereby it is possible to meet the requirements for curtailing the installation space of the transmission system including the steering assistance motor and simplifying the adjustment work at the assembly.

DISCLOSURE OF THE INVENTION

A power steering apparatus of the present invention has a constitution to assist steering by transmitting rotational force of a motor driven according to steering to a steering shaft supported in a housing with its rotary movement restrained and by moving said steering shaft in the axial direction, comprising a rotary cylinder supported in said housing with its movement in the axial direction restrained and rotated coaxially with said steering shaft by the rotational force transmitted from the motor, a plurality of feed rings fit and held in said rotary cylinder, made eccentric in different directions with respect to the axial center of the rotary cylinder, being rotatable on the axis that is parallel with said axial center, a spiral groove provided on the outer circumference of the steering shaft to be engaged at one position in a circumferential direction with a projection provided around the inner surface of the feed ring, and adjusting means for adjusting the eccentricity amount of the plural feed rings by the operation from the outside of the rotary cylinder.

FIG. 1 shows an explanatory view for illustrating the principle of converting the rotation of the feed ring of the present invention to the movement in axial direction of the steering shaft. The steering shaft 101 is supported under allowance of shift in the axial direction only. The feed ring 163 has a steering shaft 101 inserted through its inner circumferential portion, the inner diameter is larger than the outer diameter of the steering shaft 101, and the feed ring 163 is disposed eccentrically to the axial center of the steering shaft 101 so as to come into contact with the outer circumferential surface of the steering shaft 101 at one place of the inner circumferential surface of the feed ring 163. Further, the axial center of the feed ring 163 is provided with inclination by an angle θ to the axial center of the steering shaft 101.

When the feed ring 163 having such constitution rotates around the axial center of the steering shaft 101; for example, in the white base arrow mark direction around the axial center of the steering shaft 10, the feed ring 163 is to rotate around the steering shaft 101 while being in contact with the steering shaft 101 always at the same position on the inner circumferential surface thereof. As the feed ring 163 shows a tendency to make screw advance in the direction inclined by the angle θ in itself to the direction of rotation like a female screw, and the friction force F acts to the inclination direction at the contact portion, so that the shift of the steering shaft 101 in the axial direction can be attained by the component force Fsin θ in the axial direction of the steering shaft 101 at that time.

Such a shift can be attained in the same manner by setting the axial center of the feed ring in parallel with the axial center of the steering shaft, and engaging the feed ring with the spiral engaging groove provided on the outer circumferential surface of the steering shaft at an angle with the axial direction. The arrangement of the feed ring having the axial center parallel with the steering shaft can be realized with high positional precision inside the rotary cylinder which rotates coaxially with the steering shaft, and further, the feed ring can be favorably engaged with the engaging groove on the outer circumference of the steering shaft. Accordingly, it becomes possible to convert the rotation of the motor for assisting the steering transmitted to the rotary cylinder to the movement in the axial direction of the steering shaft with high efficiency.

Another power steering apparatus of the present invention is characterized by having three or more feed rings, and the two feed rings held on both sides of the rotary cylinder in the axial direction are inserted in fitting holes in the axial direction through openings aligned on both end faces of the rotary cylinder and held therein, the fitting holes being formed with circular sections corresponding to the respective outer shapes of the feed rings and on both ends of the rotary cylinder, and other feed rings are inserted in the fitting parts in a radial direction through the openings aligned on the outer circumferential surface of the rotary cylinder and held therein, the fitting parts being formed with semicircular bottom faces corresponding to the respective outer configurations of the feed rings and in the intermediate part of the rotary cylinder.

In this invention, by the insertion in a fitting hole or a fitting part formed on the rotary cylinder, three or more feed rings can be held with correct positional relations kept with the axial center of the rotary cylinder and favorably engaged in the engaging groove on the outer circumference of the steering shaft, and the rotation of the motor for steering assistance can be converted to the movement in the axial direction of the steering shaft with high efficiency.

Another power steering apparatus of the present invention is characterized in that the feed rings are antifriction bearings comprising a plurality of rolling members interposed between the inner ring and the outer ring, and further in that a part or the whole of the antifriction bearings have the outer rings formed in one-piece with the rotary cylinder.

In this invention, an antifriction bearing for universal use having good shape precision is used as a feed ring to have movement conversion effected with high efficiency. Further, the outer ring of the antifriction bearing is integrated with the rotary cylinder keeping the correct positional relationship with the axial center of the rotary cylinder to have it securely engaged with the engaging groove on the outer circumference of the steering shaft.

Another power steering apparatus of the present invention is characterized in that the rotary cylinder is supported in the housing by the four-point contact ball bearing formed in one-piece utilizing a part of the rotary cylinder as an inner ring.

In this invention, a rotary cylinder holding a plurality of feed rings is supported in a housing by the four-point contact ball bearing with the rotary cylinder itself as an inner ring, thereby favorably securing the coaxial property with the steering shaft and securely engaging the feed ring held by the rotary cylinder with the steering shaft.

Another power steering apparatus of the present invention is characterized in that the motor is equipped with a cylindrical rotor coaxially connected with the rotary cylinder on one side, or that the motor is disposed outside the housing, and is constituted to transmit its force to the rotary cylinder through gearwheel means.

DESCRIPTION OF THE PREFERRED EMBODIMENTS

First Embodiment

Figure 2:
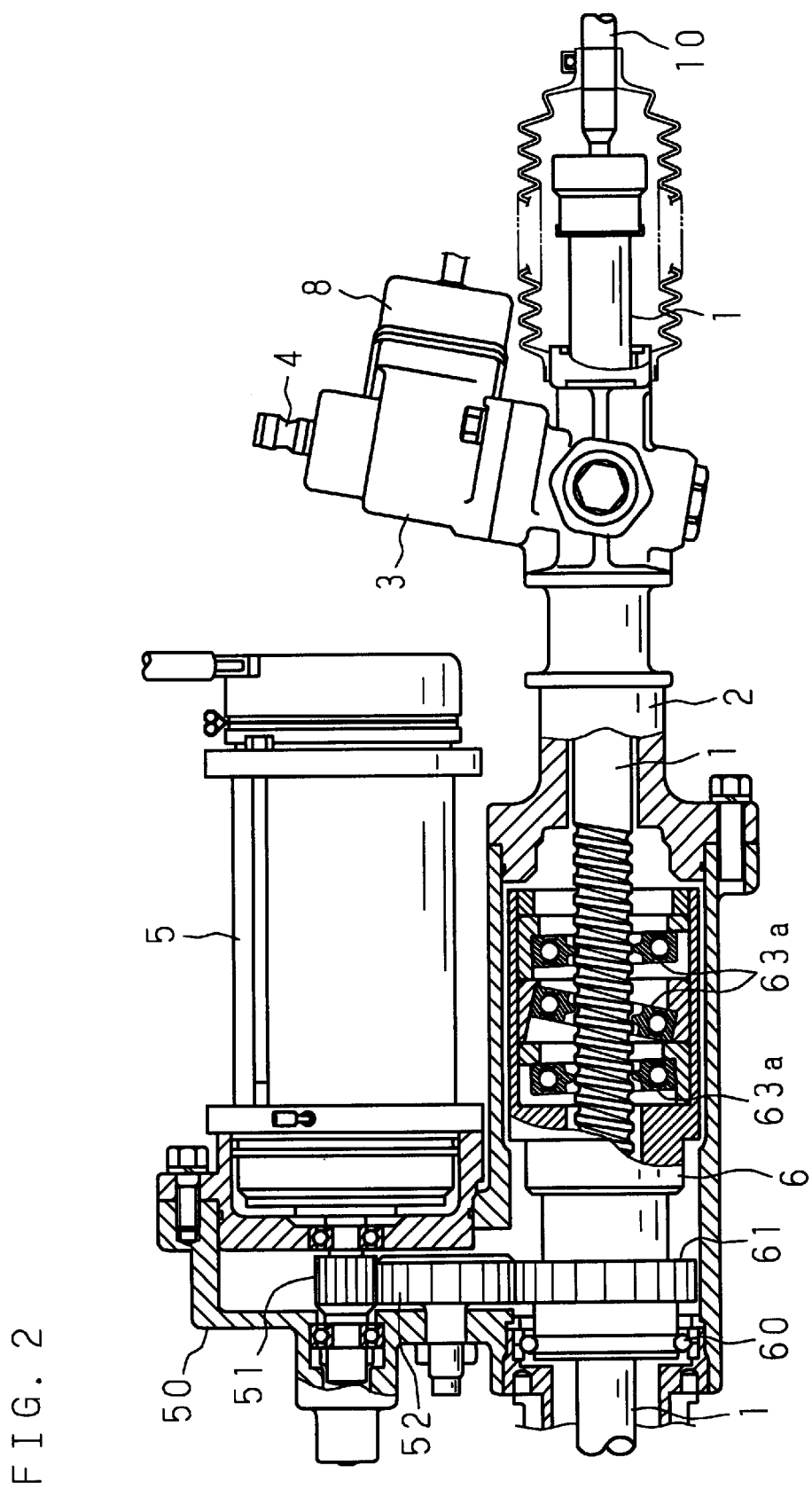
FIG. 2 is a portionially broken front elevation view showing the constitution of the essential portion of the power steering apparatus of the present invention.

Hereinafter, the present invention is explained in detail based on the drawing which shows its embodiment. FIG. 2 is a portionially broken front elevation view showing the constitution of the essential portion of the power steering apparatus of the present invention.

In this power steering apparatus, the steering shaft 1 (rack shaft) is supported in freely movable manner in the axial direction inside of the cylindrical steering shaft housing 2 which is provided in the right-left direction of the vehicle body. And, at the ends of the steering shaft 1 projecting respectively to the right and left of the steering shaft housing 2, the non-illustrated right and left traveling wheels are connected via respective tie-rods 10, 10 (one side only being illustrated), as the movements to right and left of the steering shaft 1 in the steering shaft housing 2 are transmitted to the right and left traveling wheels through the tie-rods 10, 10 and they are converted for steering.

At the half-way portion of the steering shaft housing 2, there is connected a pinion housing 3 with the axial center crossed therewith. Inside of the pinion housing 3, a pinion shaft 4 is supported in freely rotatable manner around its axial center. In FIG. 2, the pinion shaft 4 is shown only at the projecting end to the upper portion of the pinion housing 3. It is connected to the non-illustrated steering wheel via the projecting end, and according to the operation of the steering wheel for steering, it is rotated around its axis.

On the lower portion of the pinion shaft 4 provided inside the pinion housing 3 there is formed a non-illustrated pinion in one piece. Further, on the steering shaft 1 which is supported in the steering shaft housing 2, there is formed a non-illustrated rack gear over a moderate length including the crossing point with the pinion housing 3, by which the rotation of the pinion shaft 4 is converted to the movement of the steering shaft 1 in the axial direction by the engagement of the pinion and the rack gear, thus constituting the steering mechanism of rack pinion type in which the right and left traveling wheels connected to the right and left ends of the steering shaft 1 are operated according to the operation of the steering wheel.

The power steering apparatus of the present invention has a constitution to subsidize the steering which is performed as described above by the rotational force of an electric motor. In the embodiment shown in FIG. 2, the motor 5 for steering assistance is fixed to the outside of the steering shaft housing 2. To the steering shaft housing 2 there is provided in projection a cylinder shaped motor base 50 made by bending the opening portion in parallel with the steering shaft 1 and extending at a position which is separated by a moderate length from the position at which the pinion housing 3 is provided, and the motor 5 for steering assistance is fixed to the above opening portion of the motor base 50 with its output shaft arranged in approximately parallel with the steering shaft housing 2 and the internal steering shaft 1.

Inside of the motor base 50 is a hollow portion communicating with inside of the steering shaft housing 2, and the output shaft of the motor 5 is extended to the inside of the hollow portion. At the end portion of the output shaft there is provided a driving pinion 51 which is in gear engagement with a spur gear 52 which is freely rotatably supported inside the motor base 50.

On the other hand, inside the steering shaft housing 2, a rotary cylinder 6 is stored so as to be in coordination with the position in which the motor base 50 is provided. The rotary cylinder 6 is a cylindrical member which is supported inside the steering shaft housing 2 under allowance of only the rotation coaxial with the steering shaft by the 4-point contact ball bearing 60 which is formed integrally with one side thereof, and the steering shaft 1 which is inserted through the inside of the steering shaft housing 2 is inserted through the inside of the rotary cylinder 6.

Outside the rotary cylinder 6 which is supported in this manner, a spur gear 61 is integrally formed on the position coordinate with the motor base 50, and is geared with the spur gear 52 which comes into the same position from the side of the motor base 50. And, the above rotary cylinder 6 keeps the restraint position in axial direction by the 4-point contact ball bearing 60 by the rotation of the motor 5 which is conveyed through the pinion 51, spur gear 52 and spur gear 61, and rotates coaxially with the steering shaft 1 inside of the steering shaft housing 2.

Figure 3:
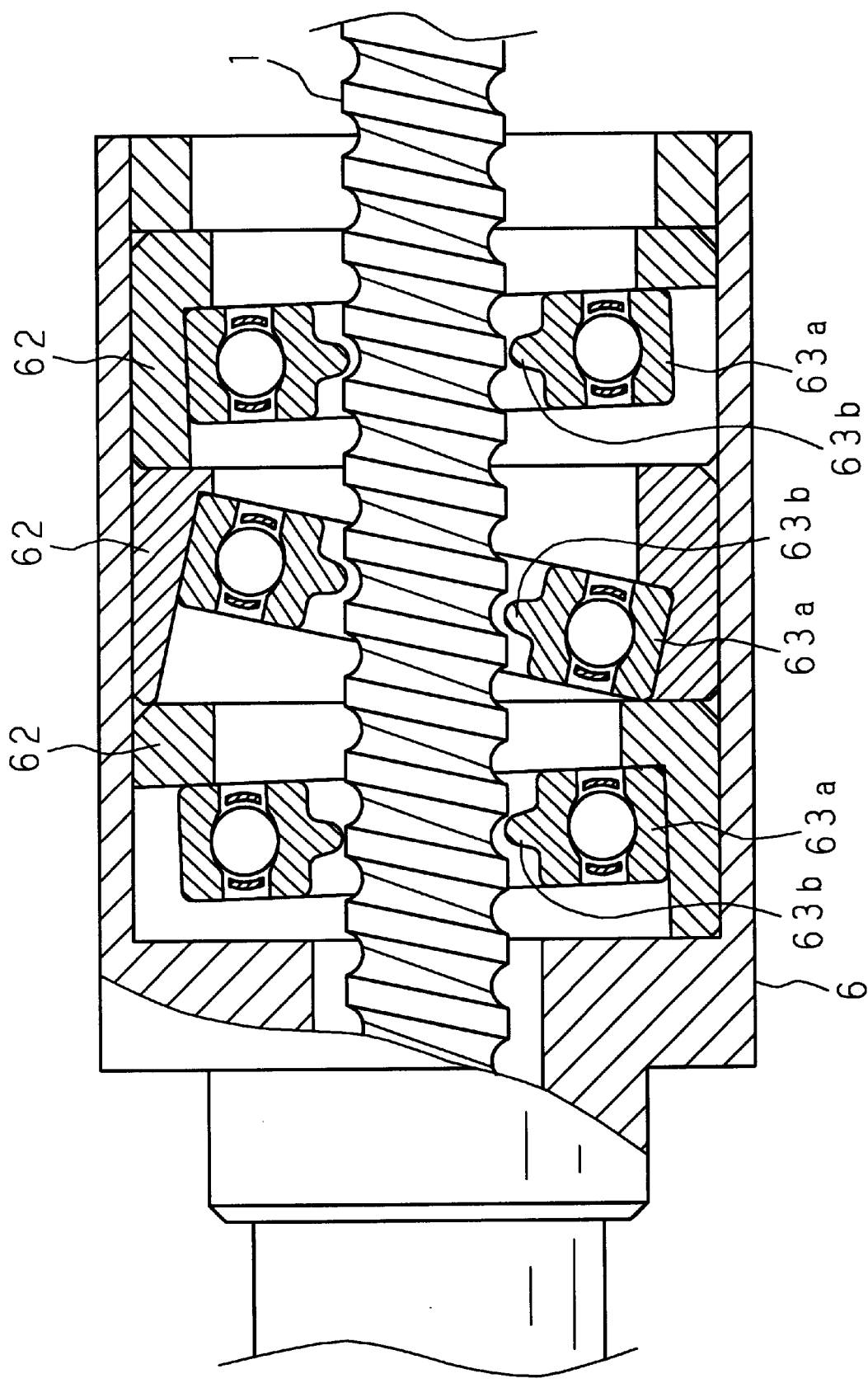
FIG. 3 is a portionial enlarged view of FIG. 2.

FIG. 3 shows a portionially enlarged view of FIG. 2. On the other side of the above rotary cylinder 6 a cylindrical enlarged-diameter portion is integrally formed coaxially, and on the hollow portion formed inside, there are provided three bearing holders 62, 62, 62 for holding the three ball bearings 63a, 63a, 63a which function as the feed rings, coaxially with the steering shaft 1.

Figure 4:
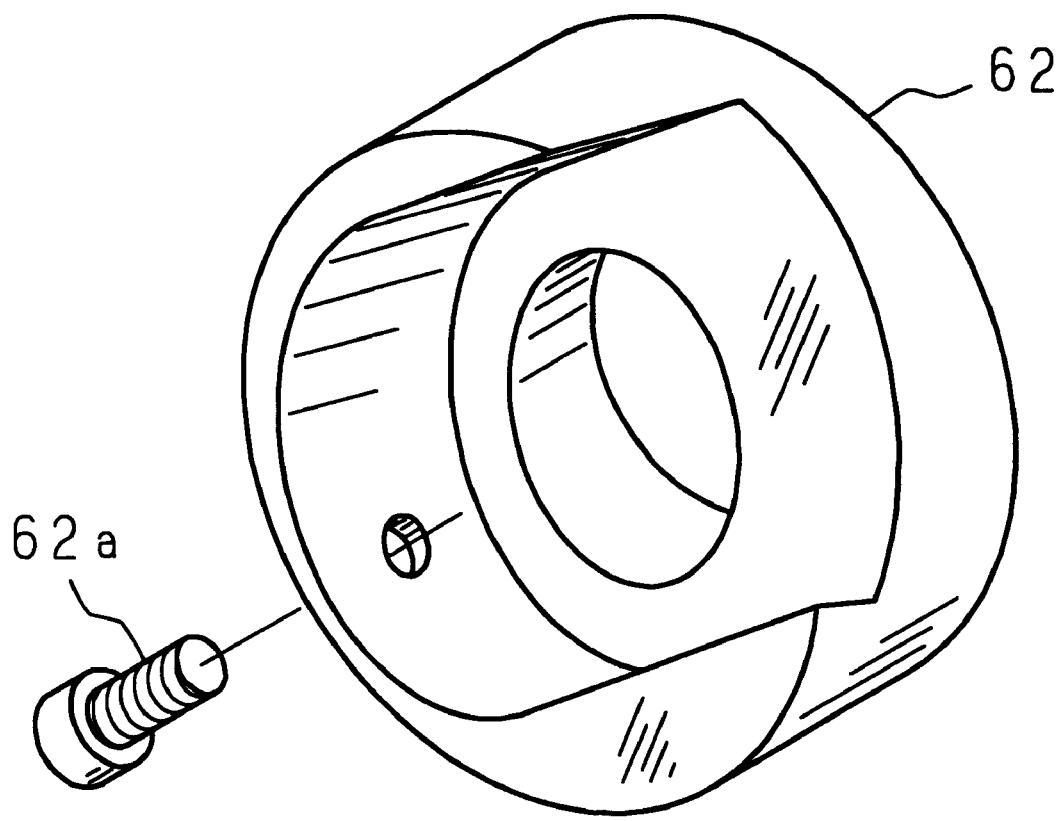
FIG. 4 is a perspective view showing the bearing holder.

FIG. 4 is a perspective view showing the bearing holder 62. The bearing holder 62 comprises, as illustrated, a short columnar member, having proper thickness in its diametral and axial direction so that a steering shaft 1 can be inserted in the hollow portion. And, the columnar recess with which the above ball bearing 63a can mate is inclined by the predetermined angle to the axial center of the outer circumferential surface of the bearing holder 62, and it is provided with eccentricity given by a predetermined distance in the direction crossing at right angles to the direction of inclination from an end of the above bearing holder 62. The circumferential wall of the bearing holder 62 surrounding the in above recess portion is lacking over 180 degrees centering on the above eccentric direction of the inner circumferential surface, and on the outer circumferential wall on the opposite side to the above direction a screw hole is bored. The foremost end portion of the adjusting screw 62a which is fastened from the outside thrusts from the inner circumferential surface of the outer circumferential wall to push out the engaged ball bearing 63a in the lacking direction of the outer circumferential wall so as to make the pressure of the ball bearing 63a in sliding contact with the steering shaft 1 adjustable.

Also, utilizing the inclination angles of the above ball bearings 63a, 63a, 63a as lead angle, there is formed a spiral groove of appropriate length on the outer circumferential surface of the steering shaft 1 in an axial direction. By engagement with a portion of the projecting portion 63b, 63b, 63b provided to be in coordination therewith on the inner circumferential surface of the above, the sliding in the axial direction of the steering shaft 1 is suppressed.

The bearing holders 62, 62, 62 holding the above ball bearings 63a, 63a, 63a are provided in the above rotary cylinders 6, respectively, under the condition of being displaced by 120 degrees each so that the sliding contact positions of the three ball bearings 63a, 63a, 63a which come into sliding contact with the outer circumferential surface of the steering shaft 1 at one point become uniform in the circumferential direction of the steering shaft 1.

As the friction force on the contact surface between the projecting portion 63b, 63b, 63b of the ball bearings 63a, 63a, 63a and the spiral groove of the steering shaft 1 becomes very large, traction grease (lubricant oil for roll transfer) is applied to the whole sliding surface and the torque is conveyed through the oil film of the lubricant oil of the contact surface. The traction grease has such properties that the viscosity of the oil film at the contact surface becomes higher according to the increase of the contact pressure, and the oil film is instantly solidified in glass form under the high contact pressure, but after release from the contact surface, the film instantly regains the original fluidity. As the shearing force of the instantly formed glass form oil film is very large, sliding at the contact surface is alleviated to attain the high transmission efficiency of the torque. This is commercialized as SUN TRACK (lubricant for roll transfer made by Monsanto, USA).

Figure 1:
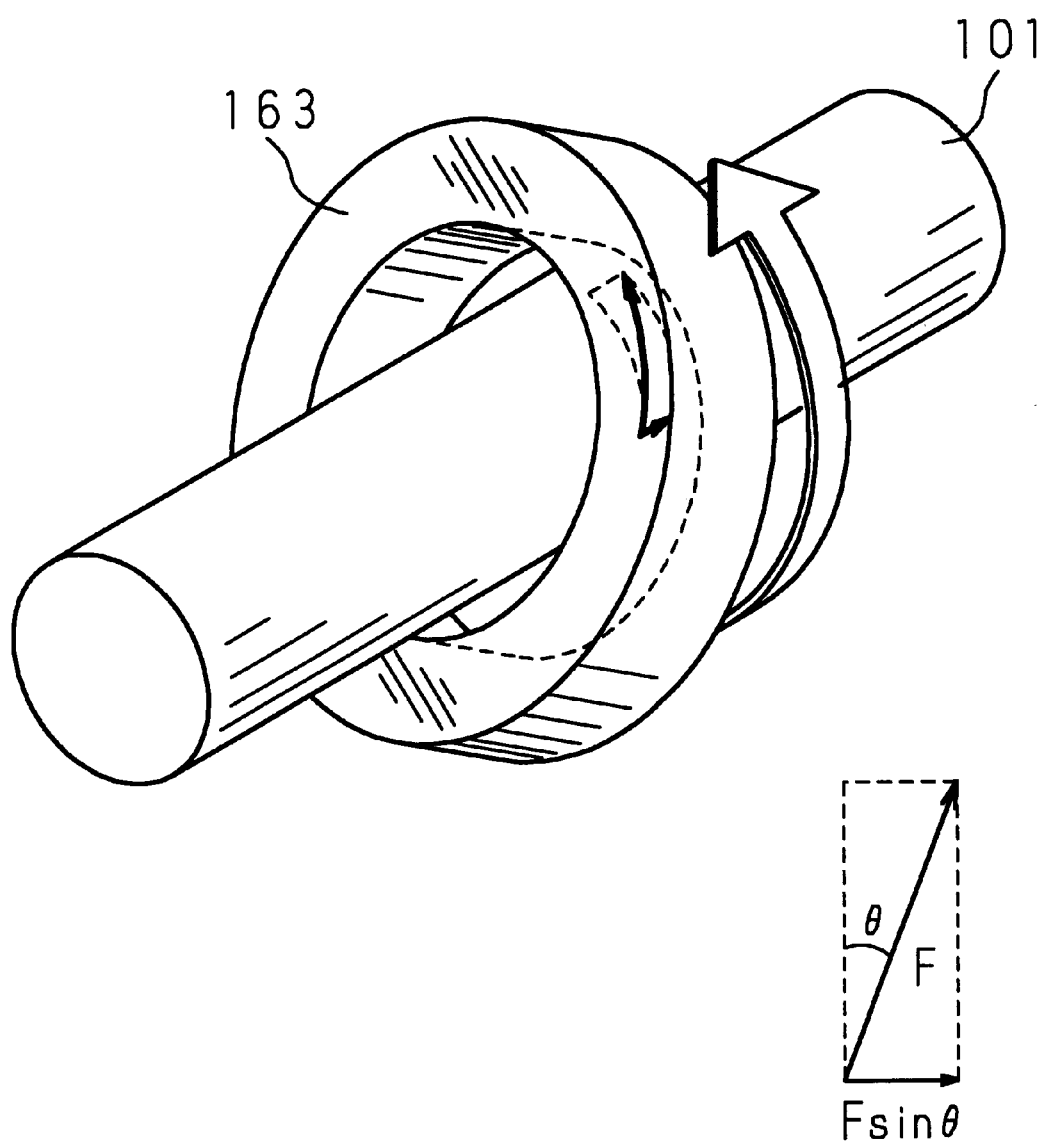
FIG. 1 is an explanatory view for illustrating the principle of converting the rotation of the feed ring of the present invention to the movement in the axial direction of the steering shaft.

In the power steering apparatus constituted as above, the outer rings of the ball bearings 63a, 63a, 63a are provided in fixed state respectively to the rotary cylinder 6 through the bearing holders 62, 62, 62 in a mode of inclination of the axial center to the steering shaft 1. Accordingly, they rotate under preservation of the inclination angle to the steering shaft 1 according to the rotation of the rotary cylinder 6. Since the above outer rings rotate in the direction different from the normal direction of rotation of the ball bearings 63a, 63a, 63a, the inner rings of the ball bearings 63a, 63a, 63a maintain the conditions of agreements in the inclination angle and inclination direction of the above outer rings, and rotate following the outer rings. The stress by the resistance which is generated at the sliding portion at the time of the initial movement is absorbed by the balls of the ball bearings 63a, 63a, 63a and the hall race by the elasticity. And, as the principle of the motion shown in FIG. 1, the sliding movements between a portion of the projecting portion 63b, 63b, 63b which are provided on the inner circumferential surfaces of the ball bearings 63a, 63a, 63a and the spiral groove provided on the outer circumferential surface of the steering shaft 1 is converted to the movement of the steering shaft 1 in the axial direction and steering is carried out.

In the above, in the constitution of the power steering apparatus according to the present invention, there was described about the case where the steering shaft 1 is the rack shaft in the rack pinion type steering mechanism. The steering shaft 1 can be any shaft for shifting the traveling wheels according to the shift in the axial direction, and it is not limited to the above rack shaft. For example, there are some among the power steering apparatuses that are provided with the shafts for exclusive use of the steering assistance in a separate body from the rack shaft, and the former shaft and the rack shaft are connected in a portion of the respective ones, so that the rotation of the motor for steering assistance is transmitted to the rack shaft via the shaft for exclusive use of the steering assistance. Such a shaft for exclusive use of the steering assistance is also included in the steering shaft of the present invention. Furthermore, it goes without saying that the application range of the present invention is not limited to the rack pinion type steering mechanism as described above but the application to other type of steering mechanism is also possible. Further, the present invention is applicable to the case where no screw groove is provided on the outer circumferential surface of the steering shaft 1.

Furthermore, the constitution may be such as to use a hydraulic motor as the motor 5 for the steering assistance use.

The sectional shape of the projecting portion 63b of the above ball bearing 63a and the sectional shape of the spiral groove of the above steering shaft 1 can be formed in various shapes depending on the size, direction, etc. of the load to the steering shaft 1. For example, by using the ball screw thread, it becomes possible to use the male screw portion of the ball screw mechanism as the steering shaft 1. Further, by using square thread screw or trapezoidal thread screw which are easier to produce than the ball screw thread, the processing steps can be reduced.

While the constitution is to use a ball bearing 63a as a feed ring, depending on the size, kind, etc. of the load to be applied to the feed ring, other commonly used bearings such as angular ball bearings, conical antifriction bearings, and the like may be used, without being limited to the ball bearing. Further, needless to say, without being limited to the ball bearing, the ring members provided with projections on the inner circumferential surface are usable.

Furthermore, while three of the ball bearings 63a are exemplified to be used, the sliding contact positions of the steering shaft 1 to the outer circumferential surface may be equally distributed in the circumferential direction of the steering shaft 1. Without limiting to the above, the number of the ball bearings 63a may be more than four. However, when the number of the ball bearings 63a is to be one or two, it is difficult to secure the balance of the sliding contact pressure to be exerted to the steering shaft 1. Therefore provision of more than three ball bearings 63a is desirable.

The above bearing holder 62 may be held in a manner that the ball bearing 63a as an advance ring may be inclined to the axial center of the steering shaft 1 and to be in sliding contact with the outer circumference of the above steering shaft 1 at one spot of the inner circumferential surface thereof. The constitution may be such as not to be provided with any of the above adjusting screw 62a, the screw hole to accommodate it, or the above lacking portion. With respect to the recess for holding the ball bearing 63a of the bearing holder 62, the bearing holder 62 may be set either inclined or eccentric inside the rotary cylinder 6, by which either the inclination or eccentricity of the recess can be omitted. Furthermore, the outer circumferential shape of the above bearing holder 62 need not be circular but may be equilateral triangle, thereby making it unnecessary to adjust the positions in the circumferential directions of three ball bearings 63a, 63a, 63a. Thus, the shape of the outer circumference is not limited.

Second Embodiment

Figure 5:
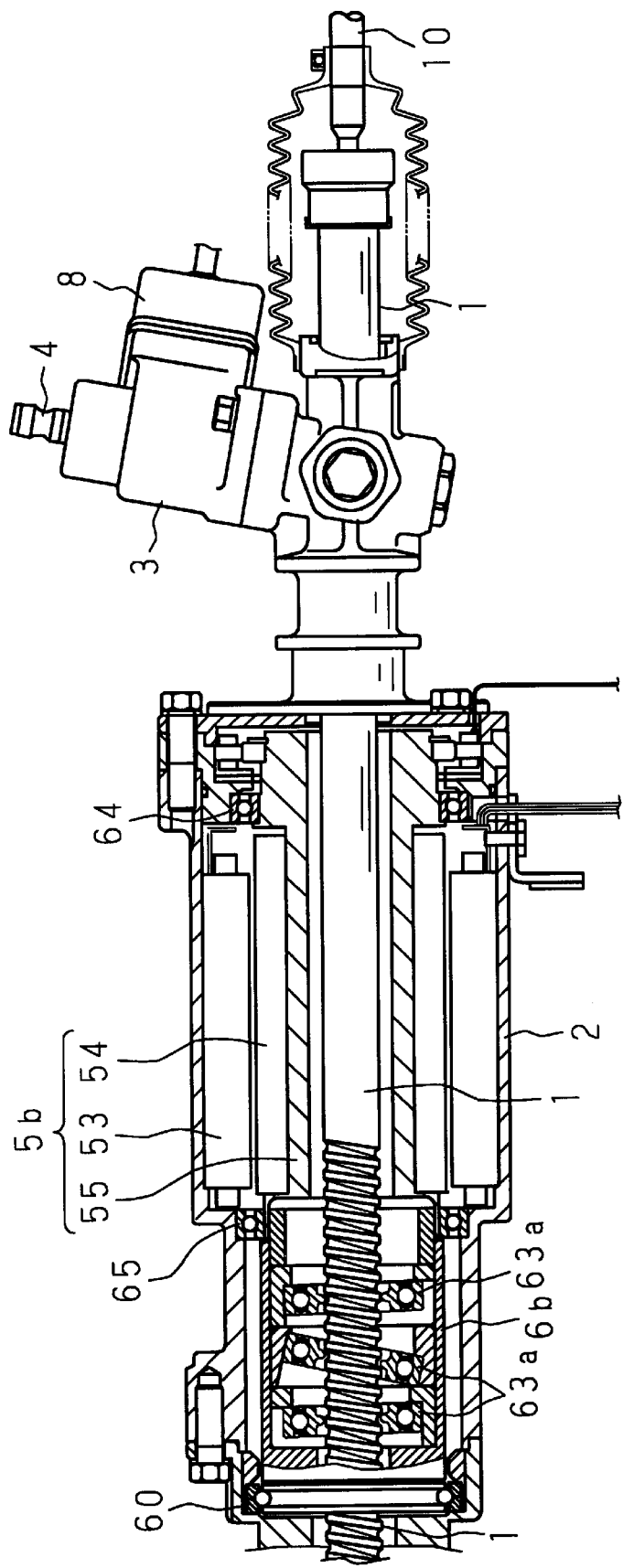
FIG. 5 is a portionially broken front elevation view showing still. another embodiment of the present invention.

FIG. 5 shows a portionially broken front elevation view showing another embodiment of the present invention. The power steering apparatus in this embodiment is different from that of the first embodiment in the point of using the brushless motor 5b disposed in coaxial manner with the steering shaft 1 in place of the motor 5 of the first embodiment. In the second embodiment, because of the coaxial disposition of the brushless motor 5b with the steering shaft 1, the constitution can be more compact than in the first embodiment.

In FIG. 5, in the inner surface of the housing 2, a stator 53 is circumferentially provided. In the inner surface of the stator 53, a plurality of permanent magnets 54 are provided opposite to and with some gap on the outer circumferential surface of the cylindrical rotor 55 which is longer than the stator 53, with the magnetic pole being differentiated from that of other adjacent permanent magnet 54. The rotor 55 is freely rotatably supported on the inner surface of the housing 2 at one end by the ball bearing 64 through the fitting member and at the other end by the similar ball bearing 65, and by these components the brushless motor 5b for steering assistance is constituted.

On the other side of the rotor 55, a rotary cylinder 6b is coaxially press fitted, and being supported in freely rotatable manner together with the rotor 55 on the inner surface of the housing 2 by the 4-point contact ball bearing 60 at the end portion on the pressure input side of the rotary cylinder 6b.

Under such constitution, when the stator 53 is energized, the rotor 55 rotates along with the permanent magnet 54, by which the rotary cylinder 6b connected integrally with the rotor 55 is rotated.

Figure 6:
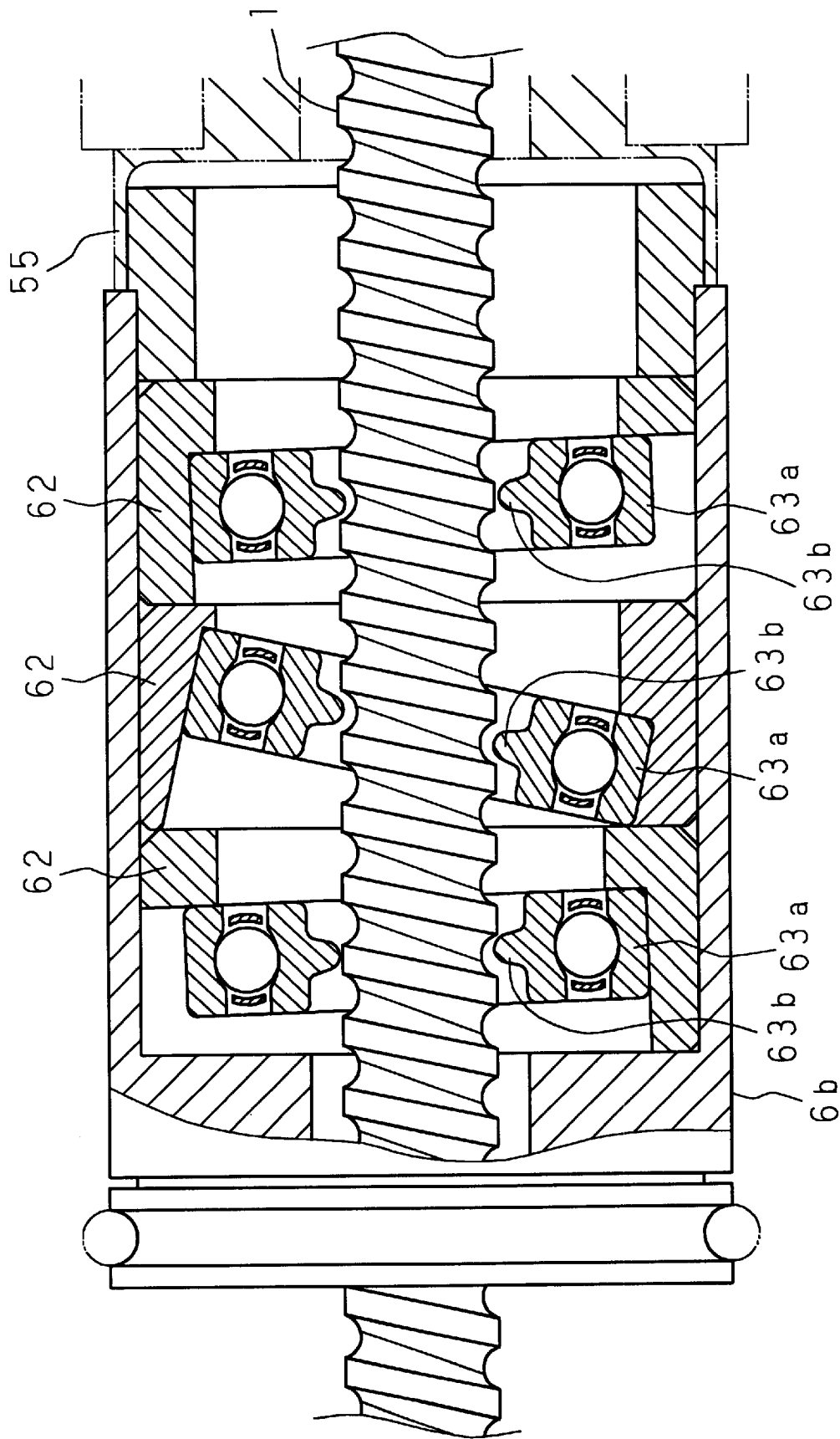
FIG. 6 is a portionially enlarged view of FIG. 5.

FIG. 6 is a portionial enlarged view of FIG. 5. In FIG. 6, in the hollow portion formed inside the rotary cylinder 6b there are fixed three ball bearings 63a, 63a, 63a of the same constitution as that of the first embodiment coaxially with the steering shaft 1 through the three bearing holders 62, 62, 62.

The power steering apparatus of this embodiment is constituted as above, and according to its rotation of the rotary cylinder 6b, it performs steering assistance similar to that of the first embodiment. Since other constitution, action and effect are similar to those of the first embodiment, the same numerals are assigned to the corresponding portions and further explanation will be omitted to avoid duplication.

Third Embodiment

Figure 7:
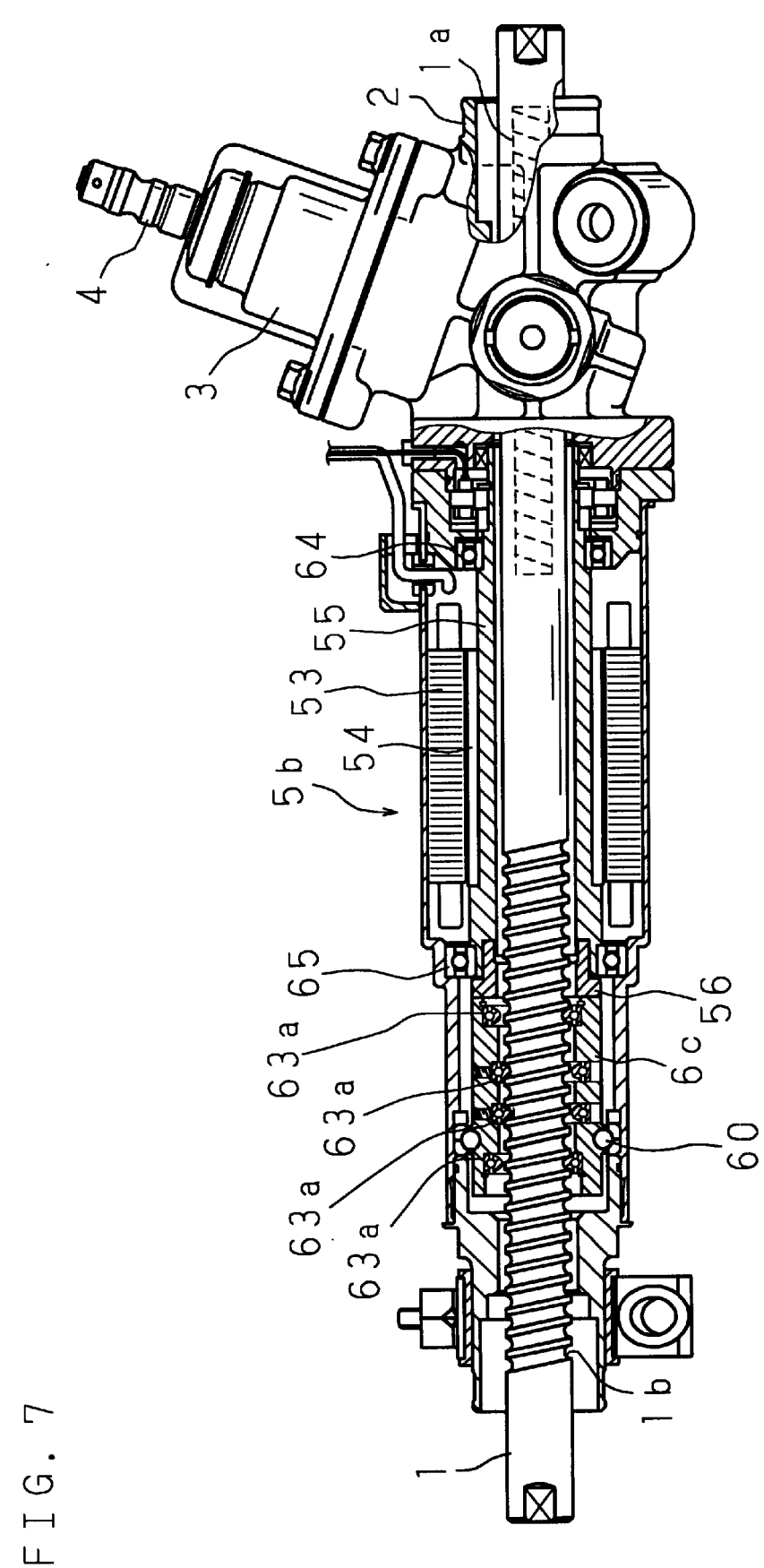
FIG. 7 is a partially broken front elevation of a power steering apparatus showing a further embodiment of the present invention.

FIG. 7 is a partially broken front elevation of a power steering apparatus showing a further embodiment of the present invention. The power steering apparatus according to this embodiment has, in the same manner as in the first embodiment and the second embodiment, a constitution to transmit the rotation of the motor 5 for steering assistance to a steering shaft 1 (rack shaft), and shift the steering shaft 1 to the axial direction to assist steering.

The steering shaft 1 is supported to be movable in the axial direction inside the cylindrical steering shaft housing 2. Both ends of the steering shaft 1 projecting respectively from both ends of the steering shaft housing 2 are connected with the non-illustrated left and right wheels through the respective tie-rods.

In the halfway part of the steering shaft housing 2, a pinion housing 3 is attached with the axial center crossed therewith. Inside the pinion housing 3, a pinion shaft 4 is supported to be rotatable around the axial center.

In FIG. 7, with respect to the pinion shaft 4, only the end projecting to the upper part of the pinion housing 3 is illustrated, and through this projecting end the pinion shaft 4 is connected with the not illustrated steering wheel, so as to rotate on the axis according to the operation of the steering wheel for steering.

On the lower part of the pinion shaft 4 provided to extend inside the pinion housing 3, a non-illustrated pinion a is integrally formed. In addition, on the steering shaft 1 supported in the steering shaft housing 2, a rack teeth 1a are formed over a suitable length including the crossing position with the pinion housing 3, and engaged with the pinion on the lower part of the pinion shaft 4. In this manner, the rotation of the pinion shaft 4 caused by the operation of the steering wheel is converted to a shift in the axial direction of the steering shaft 1 by meshing the pinion with the rack teeth 1a, and further, the shift of the steering shaft 1 in the steering shaft housing 2 is transmitted to the left and right wheels through the tie-rod, and these wheels are steered according to the operation of the above steering wheel, and thus a rack pinion type steering mechanism is constituted.

The motor for assisting steering that is performed as above is, as in the second embodiment, a brushless motor 5b disposed coaxially with the steering shaft 1, and is provided with a stator 53 circumferentially provided on the inner surface of the housing formed with its diameter expanded over a suitable length in the halfway part of the steering shaft housing 2, and a rotor 55 disposed coaxially inside the stator 53.

The rotor 55 is a cylindrical member having an inner diameter larger than the outer diameter of the steering shaft 1, being supported by a pair of left and right ball bearings 64, 65 to be rotatable around the axial center of the steering shaft housing 2. On the outer circumference of the rotor 55, a plurality of permanent magnets 54 are held facing the inner face of the stator 53 with a slight gap. The rotor 55 thus constituted rotates in both normal and reverse directions according to the electric supply to the stator 53.

The rotation of the rotor 55 produced as above is transmitted to the rotary cylinder 6c coaxially connected to one side end of the rotor 55 through the connection bracket 56. The rotary cylinder 6c is provided with a plurality of feed rings 63a, 63a . . . which are fixed in its inside. The rotary cylinder 6c is supported to be correctly coaxial with the steering shaft housing 2 inside thereof by the 4-point contact ball bearing 60 constituted in one-piece utilizing its outer circumference as an inner ring, so as to rotate coaxially with the steering shaft 1 according to the rotation of the rotor 55.

Figure 8:
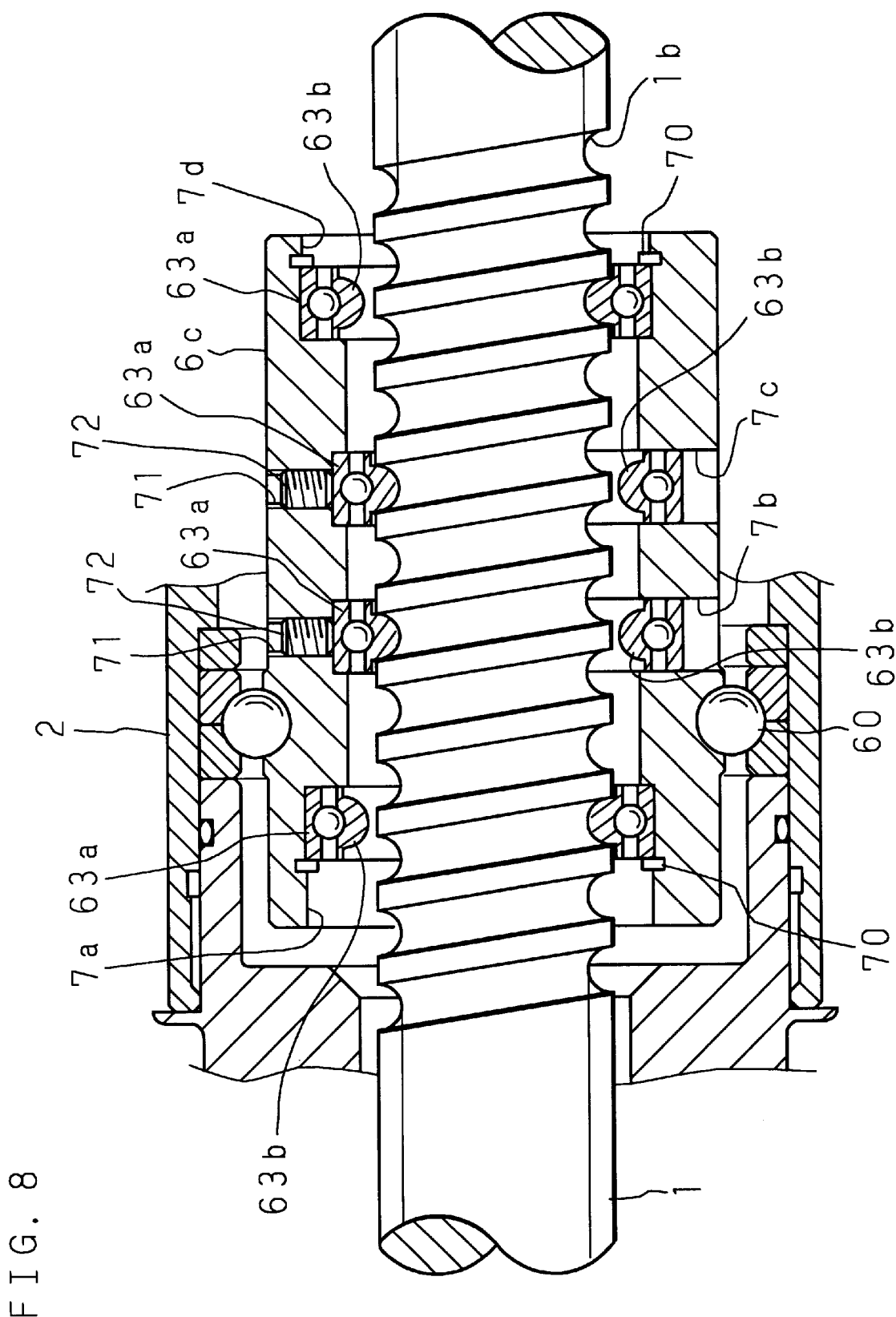
FIG. 8 is a partially enlarged view of FIG. 7.

FIG. 8 is a partial enlarged view of FIG. 7 showing the vicinity of the rotary cylinder 6c. As shown in this figure, there are four feed rings 63a, 63a . . . fixed inside the rotary cylinder 6c. The feed rings 63a, 63a . . . . are the ball bearings holding a large number of balls in the space between the outer ring and the inner ring and having the larger inner diameter than the outer diameter of the steering shaft 1 inserted through the rings. On the inner circumferential surface of the feed rings 63a, 63a . . . the projections 63b, 63b . . . having semi-circular cross-section are provided over the whole circumference. These projections 63b, 63b . . . are engaged with an engaging groove 1b formed spirally on the outer circumferential surface of the steering shaft 1 at one position in the circumferential direction.

A characteristic feature of this embodiment is in the fitting condition of the feed rings 63a, 63a . . . inside the rotary cylinder 6c. As illustrated, the feed rings 63a, 63a . . . are disposed with their respective axial centers in parallel with the axial center of the rotary cylinder 6c, and directly fit and fixed inside the rotary cylinder 6c made eccentric in the respective directions in the plane orthogonal with said axial center. The amounts of eccentricity are set to be approximately equal in the respective directions, so that the two feed rings 63a, 63a positioned at both ends of the rotary cylinder 6c are disposed in approximately the same direction, and the two feed rings 63a, 63a positioned at the center of the rotary cylinder 6c are disposed in approximately the same direction with each other.

In FIG. 8, illustration is made as if the engaging positions of the two feed rings 63a, 63a at both ends agreed in a circumferential direction of the steering shaft 1, and similarly the engaging positions of the two feed rings 63a, 63a at the central part agreed in a circumferential direction of the steering shaft 1, but in fact these engaging positions are set with displacement in a circumferential direction, so that the engagement of each feed ring 63a with the engaging groove 1b occurs for sure under the condition that said feed ring 63a is supported by other feed rings 63a, 63a . . . from various directions.

Figure 9:
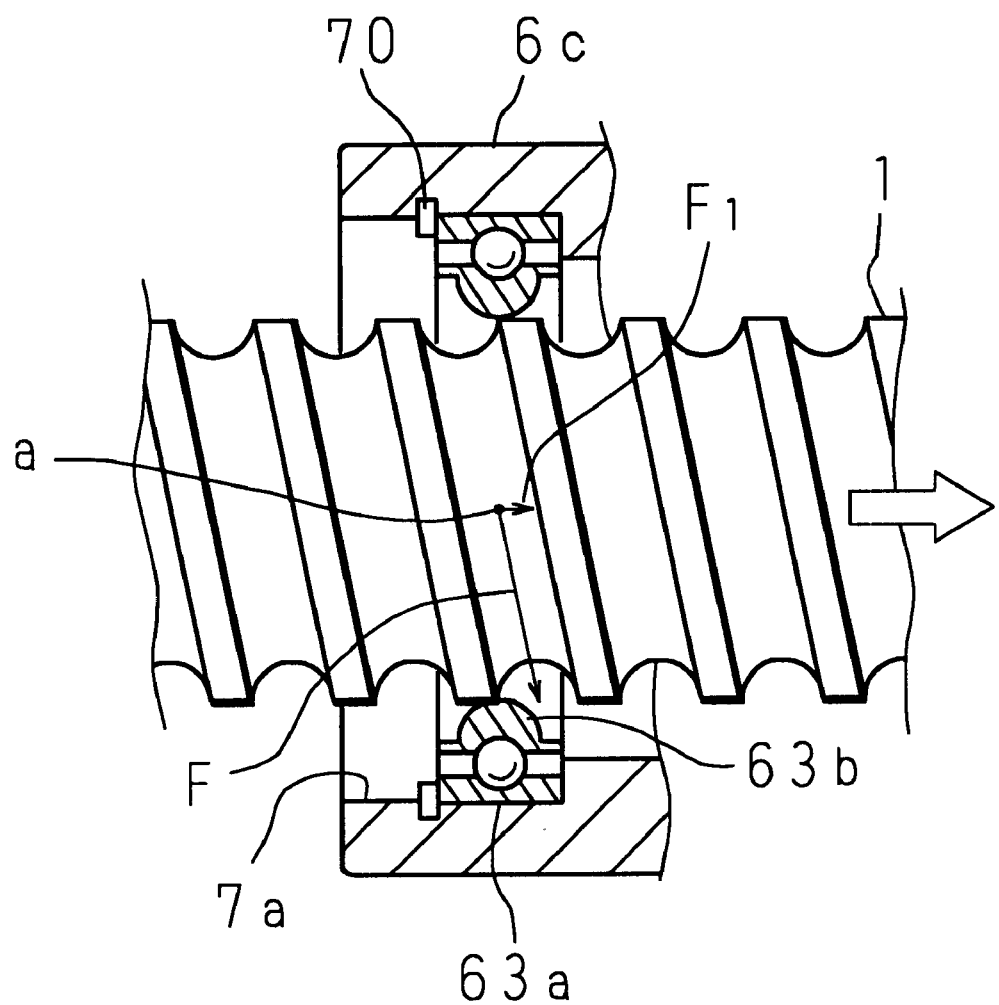
FIG. 9 is an explanatory view of the movement conversion motion.

FIG. 9 is an explanatory view on the movement conversion motion by a rotary cylinder 6c, showing an engagement relationship between a feed ring 63a on one end of the rotary cylinder 6c and an engaging groove 1b on the outer circumference of the steering shaft 1. The illustrated feed ring 63a is engaged with the engaging groove 1b on the outer circumference of the steering shaft 1 at a position shown as a in the figure. When the rotary cylinder 6c rotates on the axis under such a condition, the feed ring 63a makes rolling movement keeping the engagement with the engaging groove 1b, and this rolling movement exerts friction force F along the above engaging groove 1b to the steering shaft 1, which is pressed by the axial directional component F1 of the friction force F. Similar axial directional component is exerted at the engaging position with the other feed rings 63a, 63a . . . , whereby the steering shaft 1 moves in the pressing direction, i.e., axial direction, as shown by an arrow mark in the figure. The direction of this movement is determined according to the direction of rotation of the rotary cylinder 6c, and the rotary movement of the rotary cylinder 6c is converted into the linear movement of the steering shaft 1.

In order to have such movement conversion effected with high efficiency, it is necessary for the four feed rings 63a, 63a . . . and the spiral engaging groove 1b on the outer circumference of the steering shaft 1 to keep favorable engaging conditions. For this purpose, it is important that the positioning of the feed rings 63a, 63a . . . inside the rotary cylinder 6c is made with good precision.

Figure 10:
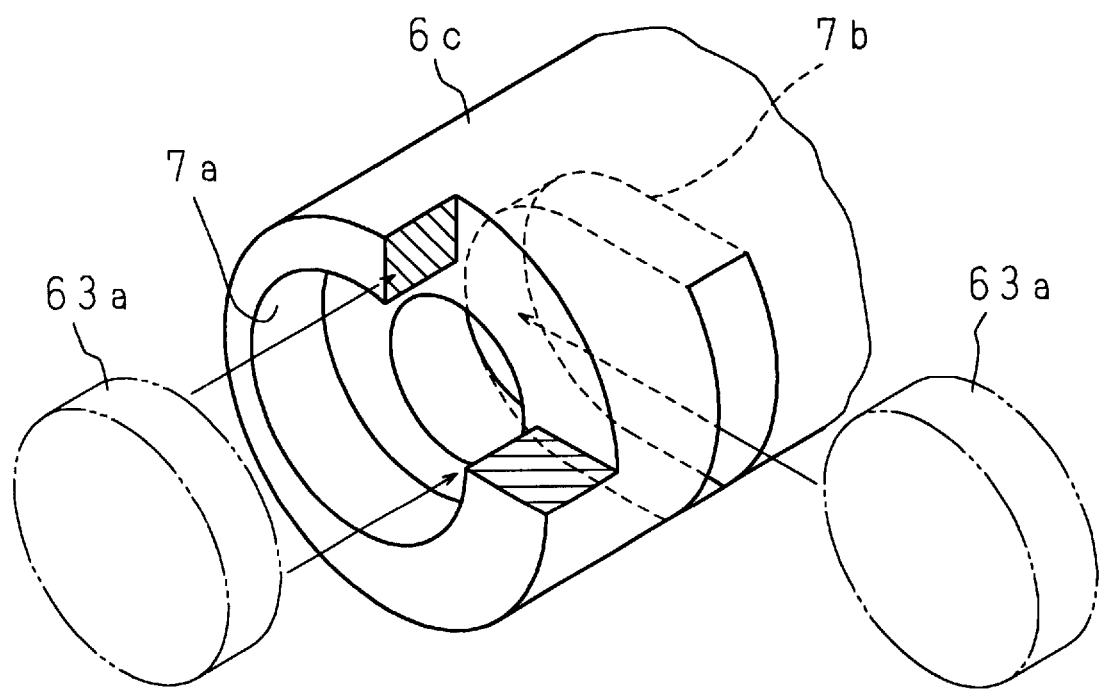
FIG. 10 is a partially broken perspective view of a rotary cylinder in the vicinity of one side end.

FIG. 10 is a partially broken perspective view in the vicinity of one end part of a rotary cylinder 6c. At the end of the rotary cylinder 6c, a fitting hole 7a is formed for receiving the feed ring 63a on said side. This fitting hole 7a is a round hole having an inner diameter approximately equal to the outer diameter of the feed ring 63a. It is formed with an opening at an end face of the rotary cylinder 6c, and the axial center approximately parallel with said axial center at a position eccentric by a predetermined length from the axial center of the rotary cylinder 6c.

To such a fitting hole 7a, the feed ring 63a is pressed in the axial direction from one side of the rotary cylinder 6c through the opening, and, as shown in FIG. 8, its one side is thrust to the bottom face of the fitting hole 7a, and the other side is brought into direct contact with the stopping ring 70 engaged in the inner face of the fitting hole 7a, and is held under constraint so as to be immovable in the axial direction. In the same manner, the feed ring 63a on the other end is press-fitted into the fitting hole 7d (ref. FIG. 8) formed in the same manner as in the fitting hole 7a above on the other end of the rotary cylinder 6c, and is fixed by the stop ring 70 so as not to come off.

The remaining two rings 63a, 63a held by the rotary cylinder 6c are fitted respectively to the fitting parts 7b, 7c formed halfway on the rotary cylinder 6c. The fitting part 7b is formed, as shown in FIG. 10 by dashed lines, as a recess having a semicircular bottom face corresponding to the profile of the feed ring 63a, and is communicated with the opening formed with a rectangular cross-section corresponding to the side sectional shape of the feed ring 63a, on the outer face of the rotary cylinder 6c.

To such a fitting part 7b, the feed ring 63a is pushed in a radial direction from outside of the rotary cylinder 6c through the opening, and its inner side is thrust to the bottom face of the fitting part 7b, and, as shown in FIG. 8, it is held with its movement in the axial direction constrained by the direct contact with the side surface of the fitting part 7b.

Another fitting part 7c is formed in a similar manner on one side of the fitting part 7b, and the feed ring 63a in the fitting part 7c is held in the same manner as in the above fitting part 7b.

The fitting holes 7a, 7d to which the feed rings 63a, 63a on both ends are to be fitted are disposed in approximately parallel with the axial center of the rotary cylinder 6c, and have a circular section with eccentricity by a predetermined length. These elements can be formed with high precision at both ends of the rotary cylinder 6c by for example lathe processing under the condition that the rotary cylinder 6c is eccentrically rotated. The bottom faces of the fitting parts 7b, 7c to which the central feed rings 63a, 63a are fitted are approximately in parallel with the axial center of the rotary cylinder 6c, and have semi-circular sections with a predetermined amount of eccentricity. These parts can be formed with high precision from the openings of the fitting holes 7a, 7d at both ends of the rotary cylinder 6c by the lathe processing under the condition that the rotary cylinder 6c is eccentrically rotated.

Accordingly, the feed rings 63a, 63a held by the fitting holes 7a, 7d, and the feed rings 63a, 63a held by the fitting parts 7b, 7c can keep the correct positional relations with the axial center of the rotary cylinder 6c, and they can be favorably engaged with the engaging groove 1b on the outer circumference of the steering shaft 1 coaxially thrust through the inside of the rotary cylinder 6c as shown in FIG. 8. Thus, it is possible to have the movement conversion as described above performed for sure and with high efficiency.

Further, as shown in FIG. 8, on the fitting parts 7b, 7c on which the central two feed rings 63a, 63a are held, the screw holes 71, 71 are formed which are positioned at the central part of the semi-circular bottom face and thrusting through the circumferential wall of the rotary cylinder 6c. To these screw holes 71, 71, the adjusting screws 72, 72 are screwed with the respective projecting ends inside the rotary cylinder 6c abutted against the outer faces of the corresponding feed rings 63a, 63a.

Accordingly, by screw-advancing these adjusting screws 72, 72 inside the respective screw holes 71, 71, the central two feed rings 63a, 63a are pressed to a radial direction from the bottom face side of the respective fitting parts 7b, 7c, and press-fitted to the engaging groove 1b on the outer circumference of the steering shaft 1 by decreasing the respective eccentric amounts to the axial center of the rotary cylinder 6c. By this press-fitting, the steering shaft 1 is displaced inside the rotary cylinder 6c, and is set at the position determined by the remaining two feed rings 63a, 63a fitted on both ends of the rotary cylinders 6c.

Here, the two feed rings 63a, 63a on both ends are held by the fitting holes 7a, 7d which can be processed with high precision from the end faces of the rotary cylinder 6c, and keep the correct positional relations to the axial center of the rotary cylinder 6c. Accordingly, it is possible to improve the eccentricity between the rotary cylinder 6c and the steering shaft 1 by screw-advance adjustment of the adjusting screws 72, 72, by which the engagement between the feed rings 63a, 63a held by the rotary cylinder 6c and the engaging groove 1b on the outer circumference of the steering shaft 1 is strengthened, thus further ensuring the movement conversion as described above.

The above-stated feed rings 63a, 63a . . . are the ball bearings provided with a large number of balls between the outer ring and the inner ring. As these balls move in rolling without changing the mutual positions without any danger of coming into collision, they make low noises caused by the movement conversion as described above, permitting quiet operations. The feed rings 63a, 63a . . . can be constituted by an antifriction bearings, other than the ball bearing, such as a roller bearing provided with a large number of rollers between the outer ring and the inner ring.

Fourth Embodiment

Figure 11:
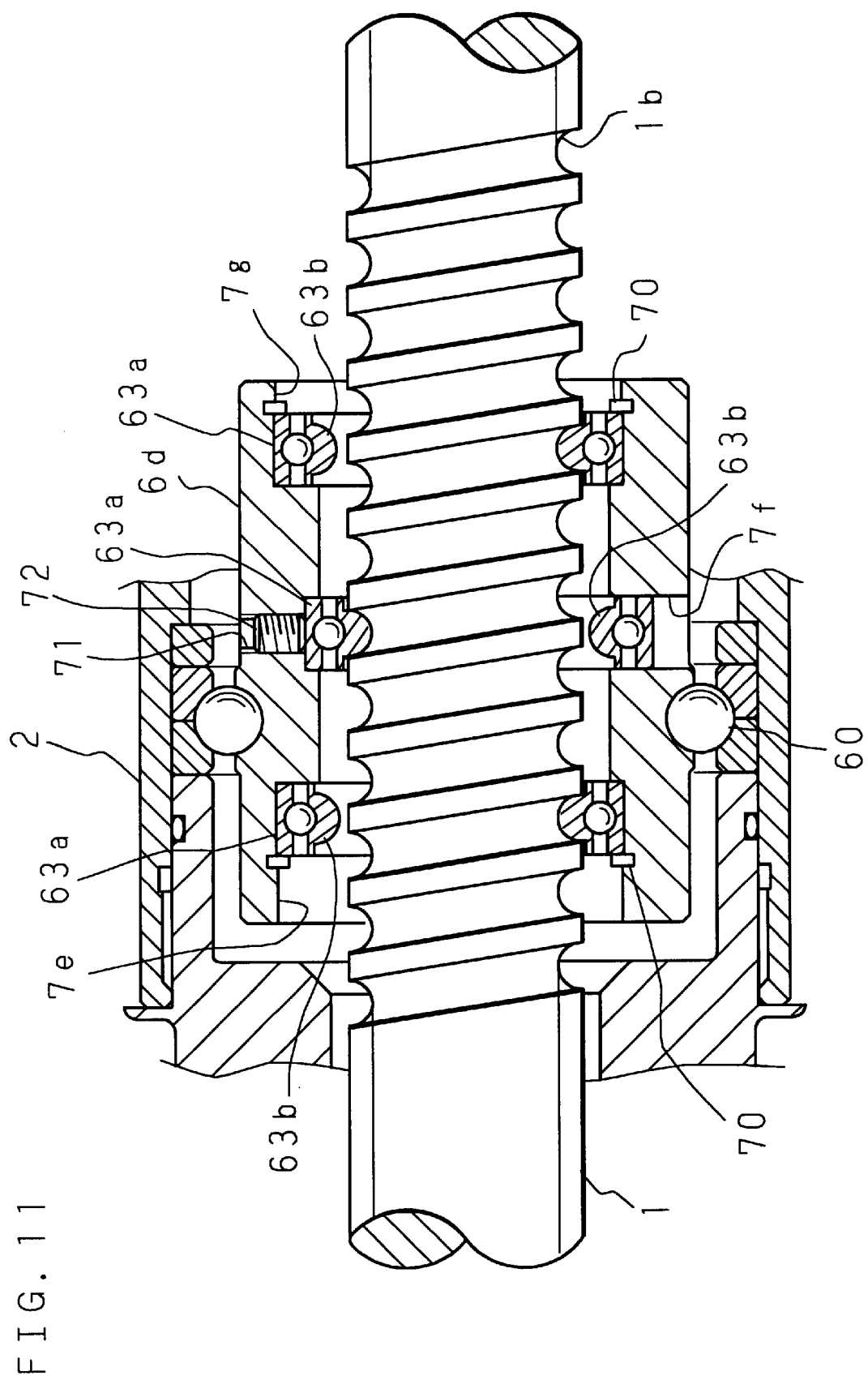
FIG. 11 is an enlarged sectional view of an essential part showing a further embodiment of the power steering apparatus according to the present invention.

FIG. 11 is an enlarged sectional view of an essential part of a power steering apparatus showing a further embodiment of the present invention. This embodiment is constituted by modifying the movement conversion part similar to that of the third embodiment with three feed rings 63a, 63a . . . .

In FIG. 11, inside the rotary cylinder 6d, three feed rings 63a, 63a . . . are held with their respective axial centers kept in approximately parallel with the axial center of the rotary cylinder 6d and made eccentric in the respective directions. With the engaging groove 1b on the outer circumference of the steering shaft 1, two feed rings 63a, 63a on both ends are engaged from the same side in the radial direction, and the central feed ring 63a is engaged likewise from the other side.

Of the feed rings 63a, 63a . . . as above, the two feed rings 63a, 63a on both ends are held, being inserted from the axial direction into the fitting holes 7e, 7g formed on both ends of the rotary cylinder 6d in the same manner as in the fitting holes 7a, 7d above, and the central feed ring 63a is held, being inserted from a radial direction into the fitting part 7f formed in the central part of the rotary cylinder 6d in the same manner as in the above fitting parts 7b, 7c. With this structure, the three feed rings 63a, 63a . . . are allowed to keep the correct positional relations to the axial center of the rotary cylinder 6d, to favorably engage with the engaging groove 1b on the outer circumference of the steering shaft 1, and to effect the movement conversion with high efficiency.

Further, the central feed ring 63a is brought into direct contact with the front end of the adjusting screw 72 projecting to the bottom surface of the fitting part 71, so that the eccentricity to the axial center of the rotary cylinder 6d can be adjusted by the screw advance of the adjusting screw 72. By this adjustment, the engagement of the respective feed rings 63a, 63a . . . in the engaging groove 1b on the outer circumference of the steering shaft 1 can be reinforced, and the movement conversion as described above can be effected more reliably.

A constitution provided with more than four feed rings 63a, 63a . . . also can be realized in the same manner. The use of many feed rings 63a, 63a . . . is effective for the use in a large load. A movement conversion apparatus having two or one feed ring 63a, but in such a case the feed rings 63a are engaged with the outer circumference of the steering shaft 1 at two or less positions, and there is a concern that the engagement may fail due to the warping of the steering shaft 1.

Fifth Embodiment

Figure 12:
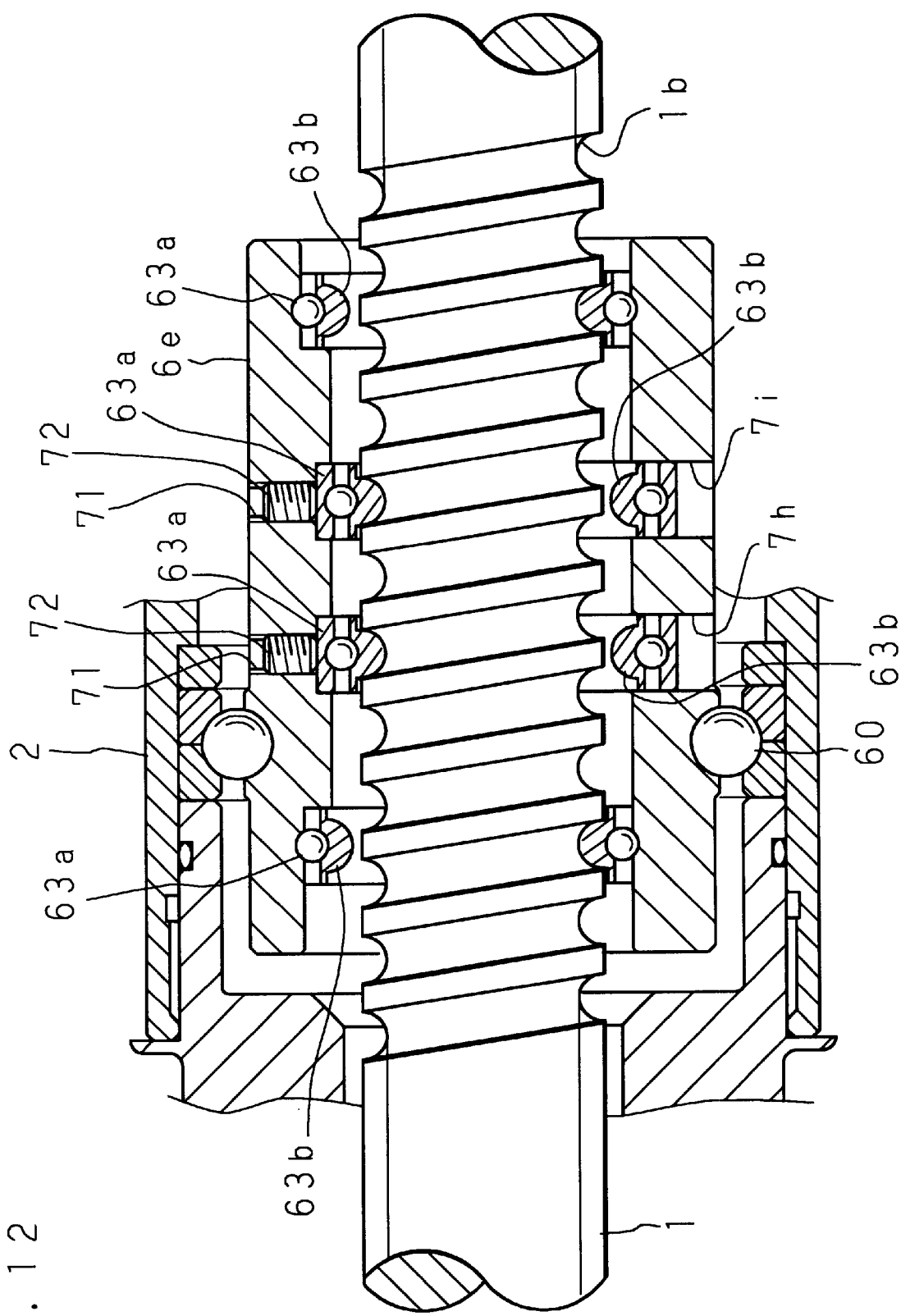
FIG. 12 is an enlarged sectional view of an essential part showing a further embodiment of the power steering apparatus according to the present invention.

FIG. 12 is an enlarged sectional view of an essential part showing a further embodiment of the power steering apparatus according to the present invention having four feed rings 63a, 63a . . . as in FIG. 8.

In this movement conversion apparatus, the four feed rings 63a, 63a . . . are fixed, having the axial centers approximately in parallel with the axial center of the rotary cylinder 6e being eccentric in the respective directions. The two feed rings 63a, 63a on both ends are engaged with the spiral groove on the outer circumference of the steering shaft 1 from the same side in radial direction, and two feed rings at the center are likewise engaged from the other side.

The characteristic feature of this embodiment is in the constitution of the two feed rings 63a, 63a . . . positioned on both ends of the rotary cylinder 6e, and as illustrated, these rings are provided with the outer ring formed integrally with the rotary cylinder 6e, and are constituted as the ball bearings comprising a large number of balls interposed between the outer ring and the inner ring. The central two feed rings 63a, 63a . . . are held, being inserting into the fitting parts 7h, 7i provided in the corresponding positions of the rotary cylinder 6e from a radial direction, in the same manner as in the fitting parts 7b, 7c in FIG. 8, and the eccentricity amount is made adjustable by screw advance of the adjusting screw 72.

In this embodiment, the four feed rings 63a, 63a . . . are capable of keeping the correct positional relations with the axial center of the rotary cylinder 6d, and especially, as the feed rings 63a, 63a on both ends are positioned with high precision, the engagement with the engaging groove 1b on the outer circumference of the steering shaft 1 is realized more satisfactorily, so that the engagement with the engaging groove 1b on the outer circumference of the steering shaft 1 is more favorably realized, and the movement conversion can be effected with high efficiency.

Sixth Embodiment

Figure 13:
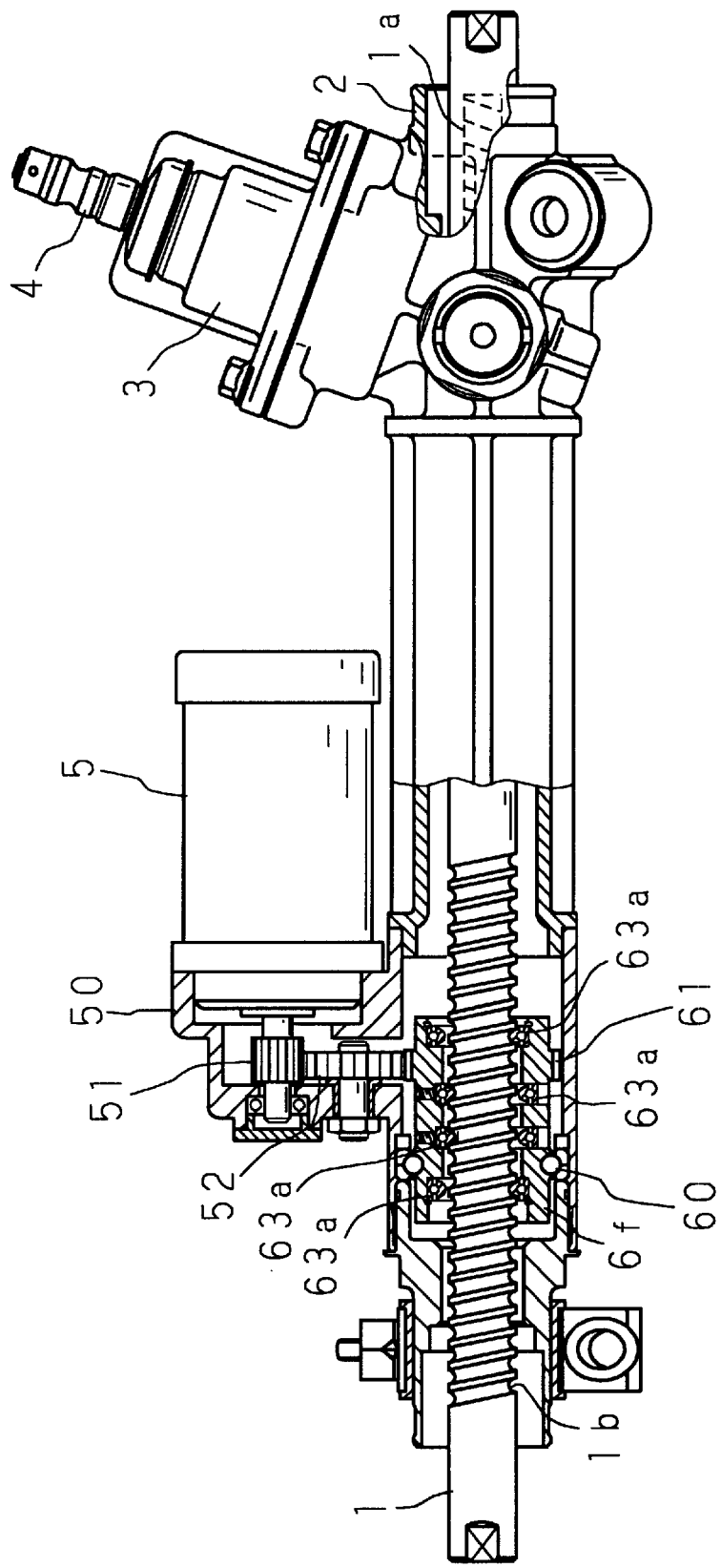
FIG. 13 is a partially broken front elevation showing a further embodiment of the power steering apparatus according to the present invention.

FIG. 13 is a partially broken front elevation of the power steering apparatus of the present invention showing a further embodiment of the present invention. The power steering apparatus shown in this figure has a constitution that, as in the first embodiment shown in FIG. 2, the rotation of the motor 5 for steering assistance mounted on the outside of the steering shaft housing 2 is transmitted to the steering shaft 1 (rack shaft) supported inside the steering shaft housing 2 to shift the steering shaft 1 to the axial direction so as to assist steering.

To the steering shaft housing 2, a motor seat 50 projecting outward in a radial direction is connected at a position alienated in the axial direction from the crossing position of the pinion housing 3, and the motor 5 for assisting steering is secured to the motor seat 50 with its output shaft kept approximately in parallel with the steering shaft housing 2 and the steering shaft 1 inside thereof.

The inside of the motor seat 50 is in a hollow state communicating with the inside of the steering shaft housing 2, and at the output end of the motor a for steering assistance extended into the hollow part a driving pinion 51 is integrally formed. The driving pinion 51 is meshed with a spur-gear 52 supported inside the motor seat 50 to be rotatable on the axis in parallel with it.

On the other hand, inside the steering shaft housing 2, a rotary cylinder 6f is housed in coordination with the communicating position of the motor seat 50. The rotary cylinder 6f is supported inside the steering shaft housing 2 by a four-point contact ball bearing 60 formed in one-piece with its outer surface as an inner ring allowing only the axial rotation. Inside the rotary cylinder 6f, the four feed rings 63a, 63a . . . comprising the ball bearings having the axial center parallel with the rotary cylinder 6f are held with eccentricity. These feed rings 63a, 63a . . . are engaged with the spiral engaging grooves 1b on the outer circumference of the steering shaft 1 through the semi-circular projections provided circumferentially on the respective inside surfaces, so that the rotation of the rotary cylinder 6f inside the steering shaft housing 2 is converted to a shift of the steering shaft 1 in the axial direction.

On the outer circumference of the rotary cylinder 6f, at a position corresponding to the communicating part of the motor seat 50 on one side of the part supported by the four-point contact ball bearing 60, a spur gear 61 is formed integrally, and this spur gear 61 is meshed with the spur gear 52 supported by the inside hollow part of the motor seat 50 from the opposite side of the driving pinion 51. With this arrangement, the rotation of the motor 5 for steering assistance mounted on the motor seat 50 is transmitted to the rotary cylinder 6*f* through the driving pinion 51, spur gear 52 and spur gear 61, and the rotary cylinder 6*f* rotates coaxially with the steering shaft 1 inside the steering shaft housing 2, keeping the position restrained in the axial direction by the four-point contact ball bearing 60.

And, this rotation is converted with high efficiency to the axial movement of the steering shaft 1 as described above by the actions of the feed rings 63*a*, 63*a* . . . which are held eccentrically inside the rotary cylinder 6*f* and are engaged with the engaging groove 1*b* on the outer circumference of the steering shaft 1, and the steering effected by said movement is assisted.

Possibility of Industrial Utilization

As described in detail above, the power steering apparatus according to the present invention has a plurality of feed rings held eccentrically in a rotary cylinder which is rotated by the transmitted movement from a motor for assisting steering, having the axial center in parallel with the rotary cylinder. The eccentricity amount of these feed rings are made adjustable from the outside of the rotary cylinder. The respective feed rings are correctly positioned with respect to the axial center of the rotary cylinder, and can be favorably engaged with the engaging groove formed in spiral shape in the outer circumference of the steering shaft placed in coaxial relation with the rotary cylinder. Thus, with a simple constitution, the rotation of the motor for assisting steering can be converted to the movement of the steering shaft in the axial direction with high efficiency.

In addition, a plurality of feed rings can be easily assembled to the rotary cylinder keeping a correct positional relationship with it, by inserting them in the axial direction into the fitting hole having an opening on the end face of the rotary cylinder, or by inserting them in a radial direction into the fitting part having an opening on the circumferential surface of the rotary cylinder.

Furthermore, when the plurality of feed rings are constituted by antifriction bearings, the movement conversion as stated above can be performed with higher efficiency under the rolling resistance of the antifriction bearings having high shape precision. As exemplified above, the present invention has excellent effects.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such mates and bounds thereof are therefore intended to be embraced by the claims.

What is claimed is:

1. A power steering apparatus having a constitution to assist steering by transmitting rotational force of a motor driven according to steering to a steering shaft supported in a housing with its rotary movement restrained and by moving said steering shaft in the axial direction, comprising:

a rotary cylinder supported in a housing with its movement in the axial direction restrained and rotated coaxially with the steering shaft by the rotational force transmitted from the motor;

at least three feed rings fit and held in said rotary cylinder made eccentric in different directions with respect to axial center of the rotary cylinder, being rotatable on a respective axis that is parallel with said axial center;

a spiral groove provided on the outer circumference of the steering shaft to be engaged at one position in a circumferential direction with a projection provided around the inner surface of each feed ring, said positions being spaced by substantially equal angles in the circumferential direction; and an adjuster adjusting the eccentricity amount of the feed rings by operation from the outside of the rotary cylinder.

2. The power steering apparatus according to claim 1, wherein the feed rings are antifriction bearings comprising a plurality of rolling members interposed between the inner ring and the outer ring.

3. The power steering apparatus according to claim 1, wherein the motor is equipped with a cylindrical rotor coaxially connected with the rotary cylinder on one side.

4. The power steering apparatus according to claim 1, wherein the motor is disposed outside the housing, and is constituted to transmit its force to the rotary cylinder through power transmission means.

5. A power steering apparatus having a constitution to assist steering by transmitting rotational force of a motor driven according to steering to a steering shaft supported in a housing with its rotary movement restrained and by moving said steering shaft in the axial direction, comprising:

a rotary cylinder supported in a housing with its movement in the axial direction restrained and rotated coaxially with the steering shaft by the rotational force transmitted from the motor;

a plurality of feed rings fit and held in said rotary cylinder made eccentric in different directions with respect to the axial center of the rotary cylinder, being-rotatable on a respective axis that is parallel with said axial center;

a spiral groove provided on the outer circumference of the steering shaft to be engaged at one position in a circumferential direction with a projection provided around the inner surface of each feed ring;

an adjuster adjusting the eccentricity amount of the plural feed rings by operation from the outside of the rotary cylinder; and wherein:

the number of the feed rings is more than two;

two of the feed rings held on both sides of the rotary cylinder in the axial direction are inserted in fitting holes in the axial direction through openings aligned on both end faces of the rotary cylinder and held therein, the fitting holes being formed with circular sections corresponding to the respective outer shapes of the fee rings and on both ends of the rotary cylinder; and other feed rings are inserted in fitting parts in a radial direction through openings aligned on the outer circumferential surface of the rotary cylinder and held therein, the fitting parts being formed with semi-circular bottom faces corresponding to the respective outer configurations of the feed rings and in the intermediate part of the rotary cylinder.

6. The power steering apparatus according to claim 5, wherein the feed rings are antifriction bearings comprising a plurality of rolling members interposed between an inner ring and an outer ring.

7. A power steering apparatus having a constitution to assist steering by transmitting rotational force of a motor driven according to steering to a steering shaft supported in a housing with its rotary movement restrained and by moving said steering shaft in the axial direction, comprising:
- a rotary cylinder supported in a housing with its movement in the axial direction restrained and rotated coaxially with the steering shaft by the rotational force transmitted from the motor;
- a plurality of feed rings fit and held in said rotary cylinder made eccentric in different directions with respect to the axial center of the rotary cylinder, being rotatable on a respective axis that is parallel with said axial center;
- a spiral groove provided on the outer circumference of the steering shaft to be engaged at one position in a circumferential direction with a projection provided around the inner surface of each feed ring;
- an adjuster adjusting the eccentricity amount of the plural feed rings by operation from the outside of the rotary cylinder; and
- wherein the feed rings are antifriction bearings comprising a plurality of rolling members interposed between an inner ring and an outer ring, a part or whole of the antifriction bearings have the outer rings formed in one-piece with the rotary cylinder.

8. A power steering apparatus having a constitution to assist steering by transmitting rotational force of a motor driven according to steering to a steering shaft supported in a housing with its rotary movement restrained and by moving said steering shaft in the axial direction, comprising:
- a rotary cylinder supported in a housing with its movement in the axial direction restrained and rotated coaxially with the steering shaft by the rotational force transmitted from the motor;
- a plurality of feed rings fit and held in said rotary cylinder made eccentric in different directions with respect to the axial center of the rotary cylinder, being rotatable on a respective axis that is parallel with said axial center;
- a spiral groove provided on the outer circumference of the steering shaft to be engaged at one position in a circumferential direction with a projection provided around the inner surface of each feed ring;
- an adjuster adjusting the eccentricity amount of the plural feed rings by operation from the outside of the rotary cylinder; and
- wherein the rotary cylinder is supported in the housing by a four-point contact ball bearing formed in one-piece utilizing a part of the rotary cylinder as an inner ring.

* * * * *